US008483757B2

(12) United States Patent
Bodley et al.

(10) Patent No.: US 8,483,757 B2
(45) Date of Patent: Jul. 9, 2013

(54) WIRELESS MULTI-USER AUDIO SYSTEM

(75) Inventors: Martin Reed Bodley, Sudbury, MA (US); Jean-Pierre Carney, Sudbury, MA (US); Donald William Kugler, Jr., Punta Gorda, FL (US)

(73) Assignee: Revo Labs, Inc., Sudbury, MA (US)

(*) Notice: Subject to any disclaimer, the term of this patent is extended or adjusted under 35 U.S.C. 154(b) by 1586 days.

(21) Appl. No.: 11/668,235

(22) Filed: Jan. 29, 2007

(65) Prior Publication Data

US 2007/0147644 A1 Jun. 28, 2007

Related U.S. Application Data

(63) Continuation-in-part of application No. 11/563,292, filed on Nov. 27, 2006, now abandoned, which is a continuation-in-part of application No. 11/360,922, filed on Feb. 23, 2006, now abandoned.

(51) Int. Cl.
H04M 1/00 (2006.01)

(52) U.S. Cl.
USPC ........... 455/557; 455/416; 455/66.1; 381/334

(58) Field of Classification Search
USPC ........................................ 455/557, 416, 66.1
See application file for complete search history.

(56) References Cited

U.S. PATENT DOCUMENTS

| | | | | |
|---|---|---|---|---|
| 4,876,537 A | * | 10/1989 | Oyamada | 340/7.63 |
| 5,089,808 A | * | 2/1992 | Amirdash | 340/573.7 |
| 5,590,377 A | * | 12/1996 | Smith | 710/22 |
| 5,722,059 A | | 2/1998 | Campana, Jr. | |
| 6,195,572 B1 | * | 2/2001 | Patterson et al. | 455/570 |
| 6,212,275 B1 | * | 4/2001 | Akhteruzzaman | 379/421 |
| 6,542,497 B1 | * | 4/2003 | Curry et al. | 370/352 |
| 6,577,721 B1 | * | 6/2003 | Vainio et al. | 379/202.01 |
| 6,671,520 B1 | | 12/2003 | Kim | |
| 6,704,575 B1 | * | 3/2004 | Fujita | 455/462 |
| 6,904,289 B1 | * | 6/2005 | Narusawa | 455/522 |
| 6,987,992 B2 | * | 1/2006 | Hundal et al. | 455/569.1 |
| 7,010,311 B2 | * | 3/2006 | Liu | 455/462 |
| 7,031,665 B1 | * | 4/2006 | Trell | 455/70 |
| 7,072,675 B1 | * | 7/2006 | Kanakubo | 455/462 |
| 7,142,666 B1 | * | 11/2006 | Bates et al. | 379/421 |
| 7,231,177 B2 | * | 6/2007 | Walker et al. | 455/3.05 |
| 7,248,881 B2 | * | 7/2007 | Shostak | 455/456.1 |
| 7,283,788 B1 | * | 10/2007 | Posa et al. | 455/41.2 |

(Continued)

FOREIGN PATENT DOCUMENTS

JP 2005-341618 A 12/2005

OTHER PUBLICATIONS

International Search Report for Application No. PCT/US2010/023480, dated Oct. 12, 2010.

*Primary Examiner* — Nay A Maung
*Assistant Examiner* — Erica Fleming-Hall
(74) *Attorney, Agent, or Firm* — Robert C. Schuler

(57) ABSTRACT

Various methods and devices are provided for a wireless audio system for a number of users. The system includes a base unit that is adapted to removably store, recharge and communicate with personal microphone modules, table-top microphones, and audio adapters. The system also includes a plurality of personal microphone modules that each are adapted to be removable and coupled to a user's clothing, and to communicate wirelessly with the base unit, and table-top microphones that are adapted to communicate wirelessly with the base unit.

2 Claims, 9 Drawing Sheets

U.S. PATENT DOCUMENTS

| | | | |
|---|---|---|---|
| 7,734,287 B2* | 6/2010 | Ying | 455/423 |
| 2002/0018450 A1 | 2/2002 | McKenna et al. | |
| 2002/0038259 A1* | 3/2002 | Bergman et al. | 705/26 |
| 2002/0068561 A1* | 6/2002 | Siemens | 455/426 |
| 2002/0105959 A1* | 8/2002 | Laurin | 370/432 |
| 2002/0109621 A1* | 8/2002 | Khair et al. | 341/174 |
| 2003/0093167 A1* | 5/2003 | Sim | 700/90 |
| 2003/0096603 A1 | 5/2003 | Chen | |
| 2003/0202107 A1* | 10/2003 | Slattery | 348/207.99 |
| 2004/0039462 A1 | 2/2004 | Chen | |
| 2004/0131201 A1* | 7/2004 | Hundal et al. | 381/77 |
| 2004/0185919 A1* | 9/2004 | Yoo | 455/575.1 |
| 2004/0208182 A1 | 10/2004 | Boles et al. | |
| 2005/0002331 A1* | 1/2005 | Nolle et al. | 370/229 |
| 2005/0003812 A1* | 1/2005 | Gladwin et al. | 455/426.1 |
| 2005/0021703 A1* | 1/2005 | Cherry et al. | 709/223 |
| 2005/0068938 A1* | 3/2005 | Wang et al. | 370/352 |
| 2005/0130717 A1* | 6/2005 | Gosieski et al. | 455/575.2 |
| 2005/0153716 A1* | 7/2005 | Bodley | 455/463 |
| 2006/0058017 A1* | 3/2006 | Ng et al. | 455/419 |
| 2006/0166715 A1* | 7/2006 | Van Engelen et al. | 455/575.2 |
| 2006/0217162 A1* | 9/2006 | Bodley et al. | 455/575.1 |
| 2007/0030351 A1* | 2/2007 | Blanco et al. | 348/148 |
| 2007/0037605 A1* | 2/2007 | Logan | 455/567 |
| 2007/0147644 A1* | 6/2007 | Bodley et al. | 381/334 |
| 2007/0149246 A1* | 6/2007 | Bodley et al. | 455/556.1 |
| 2008/0037802 A1* | 2/2008 | Posa et al. | 381/77 |

* cited by examiner

WIRELESS MULTI-USER AUDIO SYSTEM

This application is a continuation-in-part of U.S. Ser. No. 11/563,292, filed Nov. 27, 2006, entitled "Wireless Multi-User Audio System," which claims the benefit of priority of U.S. Ser. No. 11/360,922, filed Feb. 23, 2006, entitled "Wireless Multi-User Audio System," which claims the benefit of priority of U.S. Ser. No. 11/032,690, filed Jan. 10, 2005, entitled "Wireless, Multi-user Audio System," which is a non-provisional application claiming the benefit of priority of U.S. Ser. No. 60/535,439, which is a provisional application filed Jan. 9, 2004, the teachings of all of the aforementioned applications are incorporated herein by reference.

BACKGROUND

Audio teleconferencing has grown in popularity. Commonly, the audio systems use a tabletop microphone. The users must thus always be relatively close to the microphone, and also must always be aware of the direction in which they are speaking. Such systems thus intrude on the meeting. In addition, as the microphones are omni-directional and located on the tabletop, they pick up and transmit to the remote participants undesirable ambient noise. Common sources of unwanted ambient noise include table noise, sidebar conversations, laptop keyboard clicks, coffee cup clinks, etc. These 'unwanted' audio sources are very damaging to the efficiency, focus and productivity of conference meetings, especially for far-end (remote) participants in the conference.

SUMMARY

This invention features a novel wireless audio system, which enables optimal audio input from one or more parties actively participating in audio conferencing, (telephony, video, net meetings) or voice recording applications.

In one exemplary embodiment, this invention features a wireless audio system for a number of users, comprising a base unit that is adapted to removably store, recharge and communicate with at least one audio adapter. The audio adapter can be adapted to couple to a wireless microphone and to communicate wirelessly with the base unit. The base unit is also adapted to removably store, recharge and communicate with at least one personal microphone module (PMM) that includes a microphone and is adapted to be removably coupled to a user's clothing, and to communicate wirelessly with the base unit. Each PMM may further comprise a mutable microphone, which may have a microphone mute-status indicator. The microphone mute-status indicator may comprise an indicator light carried by the PMM. Each PMM may further comprise a user-operable switch to control microphone muting. The wireless link may be automatically established between a PMM and the base unit when the PMM is removed from the base unit. Each PMM may further comprise a mutable microphone, and wherein the microphone is automatically muted when the PMM is removed from the base unit. The wireless link may be automatically terminated when the PMM that had been removed from the base unit is returned to the base unit.

A PMM may be uniquely registered with the base unit when the PMM is placed into the base unit. A PMM may be inactivated once it has been inactive for a predetermined time period. The predetermined time period may be user-adjustable. A PMM may be inactivated once it leaves an active distance range from the base unit. The active distance range may be user-adjustable. The base unit may further comprise a user-operable active distance range adjustment. An inactivated PMM may be reactivated once it is returned to within the active distance range of the base unit. The PMM may provide a human-perceptible indicator when it leaves the active distance range.

The base unit may further comprise a user-operable switch that is operable to mute all PMMs. The PMM muting may be accomplished by blocking the signals from the PMMs. The base unit may further comprise a user-operable switch that is operable to clear the registration of all PMMs registered with the base unit.

The wireless audio system may further comprise a video system comprising a motorized camera, six degree of freedom motion sensing equipment carried on a user's person, and a device for moving the camera in response to the user's location, to capture the user's image with the camera.

In another exemplary embodiment, the system includes a clip-on personal microphone module (PMM) and/or a table-top microphone and/or an audio adapter. One or more PMMs, table-top microphones, and audio adapters communicate with a base station, which in the preferred embodiment can support up to 12 individual PMMs and/or table-top microphones and/or audio adapters. The base station performs audio mixing and automatic gain control from all registered PMMs, table-top microphones, and audio adapters, PMM, table-top microphone, and audio adapter battery charging, and connectivity to audio patch panels or other conferencing equipment. The users remove a PMM from the holder/charger when they enter a conference call, clip the PMM onto their shirt pocket or lapel, and return the PMM to the holder when they are done.

By using discrete and wireless PMMs, located near each speaker's mouth, the system provides superior audio quality for those participants on the far-end of the conference. This is further accomplished through a combination of audio processing and the optimal positioning of the directional microphone within the PMM, which attenuates and filters ambient noise before mixing with the outgoing audio signal. Additionally, the sound quality provided by this system is ideally suited for recording purposes.

RF wireless transceivers built into each PMM enable all users to operate freely during the meeting without being tethered to wires or requiring line-of-sight to the base station. Users can even leave the room, and still participate in the call, as a plug-in ear bud allows the user to hear the received audio that is transmitted by the base station. A mute button located on the PMM allows users to cough/sneeze or have offline conversations without distracting the meeting. With a PMM, the user will forget about the microphone and focus on the discussion, unlike when the users employ headsets or tabletop microphones.

The system also includes a base station that provides wireless gateway and audio multiplexing along with the connectivity required to interface with existing audio equipment located in the conference room. Two types of base units are provided for:

(1) Rack mount for installation within an existing A/V system rack in a high end A/V type room. With this type of base, the PMMs typically are stored in a separate holder/charger base unit that can be located anywhere in the room.

(2) Tabletop, which will integrate the wireless hub and PMM holder/charging station functions in a stylish form factor.

BRIEF DESCRIPTION OF THE DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Various exemplary methods and devices are provided for an audio system that is adapted for wireless communication between multiple users. While such an audio system can have a variety of configurations, in one exemplary embodiment, the system can include one or more personal microphone modules (PMMs) and/or one or more table-top microphones that are adapted to communicate with at least one base unit to facilitate communication between multiple users.

Components of the System

Personal Microphone Modules (PMMs)

The PMM 10 Performance/Feature set can include (see FIGS. 1A and 1B) a highly directional microphone with audio processing and secure and reliable RF performance. The features set can also include extended battery life through smart power management, compact size and light weight, and system software/MMI (Machine Man Interface) that is simple to use with sophisticated performance results.

Figure 1A:
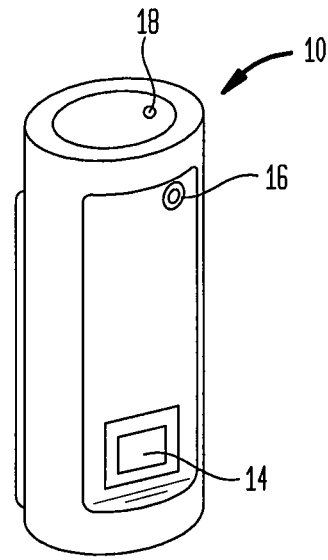
FIGS. 1A and 1B are drawings of one exemplary embodiment of a personal microphone module.
Figure 1B:
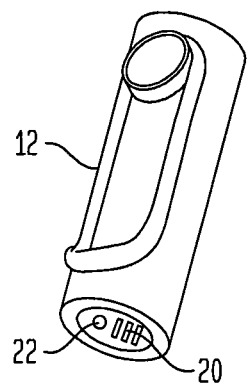
Figure 1C:
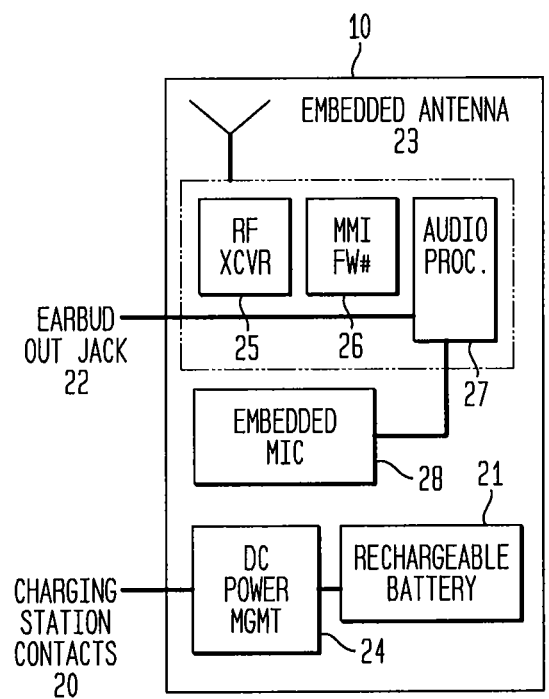
FIG. 1C is a functional block diagram of the PMM shown in FIGS. 1A and 1B.

In the preferred embodiment, a PMM 10, shown in FIGS. 1A-1C, includes a microphone input 18 that is adapted to collect sound from a user of the PMM 10 and a mute button 14 to mute the PMM 10. The PMM 10 further includes a visual indicator, for example, an LED 16 to indicate various types of status information to the user, discussed in more detail below. A user attachment component, such as a clip 12 shown in FIG. 1B, is included to attached the PMM 10 to the user. A contact 20 is disposed on the surface of the PMM 10 and is adapted to couple to a charger to charge an energy source for the PMM 10, such as a battery 21 shown in FIG. 1C. An earbud audio jack 22 allows the user to hear mixed audio when out of the hearing range of the room speaker (if one is used).

FIG. 1C illustrates a functional diagram of the PMM 10 shown in FIGS. 1A-1B. The rechargeable battery 21 is charged when the contact 20 couples with a charger. The charging of the battery 21 is controlled by a DC power management component 24. The microphone 28 picks up sounds from the user and transmits that information to an audio processing component 27 for processing. The audio processing component 27 is in electrical communication with the earbud output jack 22 to transmit mixed audio to the earbud output jack 22. A RF XCVR 25 (Radio Frequency Transceiver) is one half of a wireless link comprised of hardware and software that enables full duplex (transmit & receive) communication of audio signals between two points. A MMI FW 26 (Man Machine Interface Firmware) refers to software that enables a particular user experience to be achieved, namely how the visual cues, audio cues, or button presses allow the user to operate the product. Typically these functions are implemented on a microprocessor or digital signal processor (DSP) and may be combined with functions of the RF XCVR 25 and audio processing such as noise removal, echo cancellation and frequency equalization.

Properly achieving the performance and feature-set of the PMM are important to obtaining the most benefit to an audio conference. The directionality of the microphone acoustics rejects sound coming from below or either side of the user. As shown in FIGS. 1A-1B, an exemplary embodiment of a PMM 10 includes a component that is adapted to allow the PMM 10 to be carried by a user. For example, as shown in FIG. 1A, the PMM 10 has a clip 12 that allows it to be carried by clothing (e.g. a shirt pocket, neck tie or lapel) that places the microphone input 18 in close proximity to the speaker's mouth, which minimizes general background noise as well as cross talk between people in the room. Physical dimensions and ergonomics assist in positioning the PMM at the optimum location close to the user's mouth. Typical locations include shirt pockets, lapels or button seams. A variety of other components can be used to attached the PMM 10 to a user. For example, lanyards can also be used if no suitable clipping feature is available on clothing. Radio performance allows farther ranging capability and longer talk times. A visual indicator 16 (e.g. one or more LEDs) conveys radio-link/charging status of each PMM 10. The PMM 10 can also include an antenna 23 as shown in FIG. 2. This antenna can either be internal or external to the PMM 10. As shown in FIG. 2, the antenna 23 is an internal embedded antenna.

The PMM 10 includes a power source, for example, a battery. The battery can be a rechargeable battery 21, shown in FIG. 2, such as a LiPolymer rechargeable battery cell. Other examples of batteries include a lithium rechargeable battery, such as a lithium ion battery, a NiMH rechargeable battery, and alkaline primary cells, either in a cylinder or coin cells. A person skilled in the art will appreciate that any type or configuration of single or multiple batteries that would function to supply power to the PMM would be acceptable.

A memory chip can be included with the PMM 10 which can store software needed to operate the PMM. A person skilled in the art will appreciate that any chip capable of storing software can be used. The software provides a variety of functionality for the PMM 10, as described below.

The memory can include one or more components, such as a FLASH memory and/or a non-volatile storage, for example, an EEPROM. The non-volatile storage can be used to store a variety of information, including one or more subscription records containing information about the base units that the PMM 10 subscribes to, and the most recent subscription choice between those base units. The non-volatile storage can further include, by way of non-limiting example, information regarding DECT identity, allowed carrier set, radio calibration parameters, bandgap reference trim, and battery threshold voltages.

In one exemplary embodiment, all the features and internal structure described above relative to the PMMs can also be features of the table-top microphones, as described in more detail below.

Table-Top Microphones

Figure 8A:
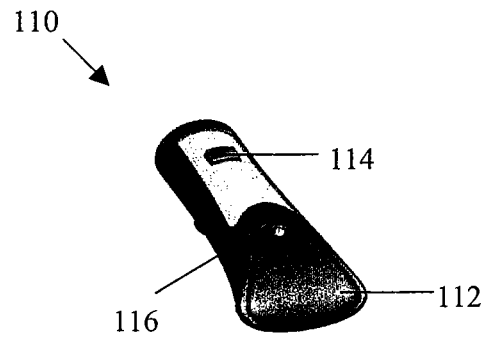
FIGS. 8A and 8B are drawings of one exemplary embodiment of a table-top microphone.
Figure 8B:
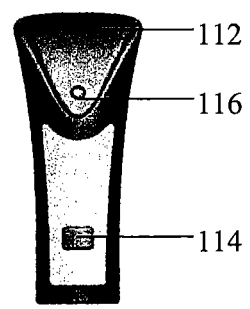

In one embodiment, the audio system can also include one or more wireless table-top microphones, shown in FIGS. 8A-8B. In a preferred embodiment, a table-top microphone 110 can include an input 112 adapted to collect sound and a mute button 114 to mute the table-top microphone. The table-top microphone 110 can also include a visual indicator, such as an LED 116 to indicate various types of status information. A contact (not shown) disposed on the surface of the table-top microphone 110 is adapted to couple to a charger of a base unit to charge an energy source for the table-top microphone 110, such as a battery. While the table-top microphone 110 can have a variety of shapes and sizes, it has a generally rectangular shape with a widened proximal end for collecting sound, and a distal end of a size and shape to allow the table-top microphone 110 to fit into a charger of a base unit, allowing both the table-top microphones 110 and the PMMs 10 to be charged using the same base unit, as discussed below. In one exemplary embodiment, the table-top microphone 110 has similar features and components as described above relative to the PMMs, except the table-top microphone 110 is adapted to sit on a surface, such a table, and can be used by one or more users.

The table-top microphones 110 can include a variety of additional features, such as a range of 30 m, and an audio bandwidth of 200-8000 Hz. The table-top microphone 110 can collect sound in a variety of ways, including directional and omni-directional patterns. The table-top microphone 110 can also include encryption, such as a 128-bit proprietary encryption per microphone channel.

Audio Adapters

In one embodiment, the audio system can also include one or more wireless audio adapters, shown in FIGS. 10-13, that can removably couple to a conventional wireless microphone, allowing the conventional wireless microphone to be used with the audio system. In a preferred embodiment, an audio adapter 210 can include an input (not shown) adapted to collect sound and a mute button 214 to mute the audio adapter. In one embodiment, the mute button 214 can have additional functions, such as the ability to turn the audio adapter 210 on and off, and the ability to establish a subscription and connection between the audio adapter 210 and a base unit. The audio adapter 210 can also include a visual indicator, such as an LED 216 to indicate various types of status information. By way of non-limiting example, the LED 216 can be used in indicate a live or muted state of the audio adapter 210, battery status, charging status, and whether the audio adapter 210 is out of range and/or is searching for a base unit. A contact 218 disposed on a surface of the audio adapter 210 is adapted to couple to a charger of a base unit to charge an energy source for the audio adapter 210, such as a battery. The battery can be, for example, a rechargeable battery, such as a lithium polymer battery or a lithium ion battery.

While the audio adapter 210 can have a variety of shapes and sizes, it has a generally cylindrical shape having a distal end of a size and shape to allow the audio adapter 210 to fit into a charger of a base unit, allowing the audio adapter 210, the table-top microphones 110, and the PMMs 10 to be charged using the same base unit, as discussed below. A proximal end of the audio adapter 210 is sized and shaped to allow the audio adapter 210 is removably couple to a conventional wireless microphone. In one exemplary embodiment, the audio adapter 210 has similar features and components as described above relative to the PMMs, except that the audio adapter 210 is adapted to removably couple to a conventional wireless microphone.

As discussed above, the proximal end of the audio adapter 210 is adapted to removably couple to a conventional wireless microphone. In one exemplary embodiment, the proximal end of the audio adapter 210 can include a connector 220 adapted to couple to a conventional wireless microphone. By way of non-limiting example, the connector 220 can be a female connector adapted to mate to a conventional wireless microphone having a corresponding male connector attached thereto. For example, the female connector can be an XLR 3-pin female connector. Examples of conventional wireless microphones that can be used with the audio adapter 210 include the Shure SM58. A release mechanism, such as a latch 222, can also optionally be included and can be adapted to disengage the connector 220 from the conventional wireless microphone. A person skilled in the art will appreciate that any mechanism can be used to facilitate the connection and disengagement of the connector to a conventional wireless microphone, and that the connection and disengagement between the connector and the conventional wireless microphone can also be achieved without the use of any type of mechanism.

The audio adapter 210 can also include other optional features. For example, the audio adapter 210 can include an audio jack 224 that is adapted to receive a hearing accessory, such as headphones or an earpiece. This allows for full duplex, two-way audio.

Base Units

The Base Unit 30, 50, 60 Performance/Feature-set can include (see FIGS. 2A and 2B, 3A and 3B, and 4A and 4B) standard audio interface, automatic audio mixing and gain control, secure and reliable RF performance, and system software/MMI that is simple to use and has sophisticated performance results. The base unit feature set can be modular, having the ability to add base units with more PMMs and/or table-top microphones and/or audio adapters and to increase the number of users per room.

Figure 9:
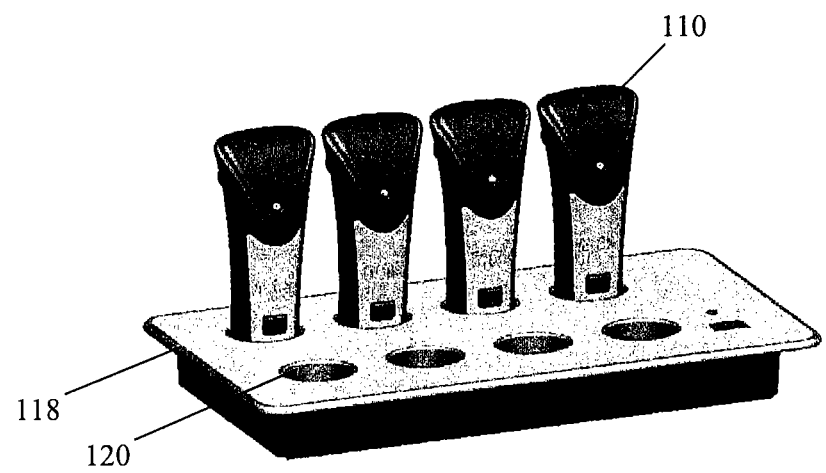
FIG. 9 is a drawing of a plurality of table-top microphones, shown in FIGS. 8A-8B, in a charging base.
Figure 10:
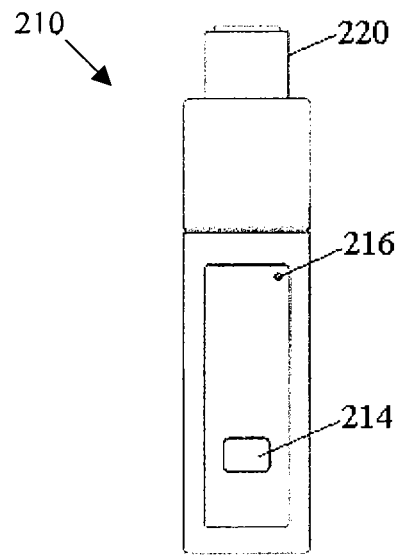
FIG. 10 is a drawing of a front view of one exemplary embodiment of an audio adapter.
Figure 11:
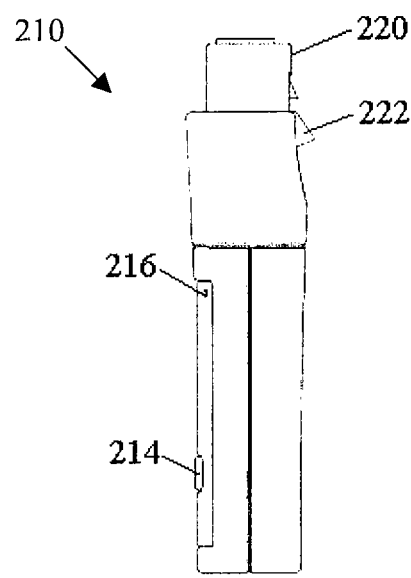
FIG. 11 is a drawing of a side view of the audio adapter of FIG. 10.
Figure 12:
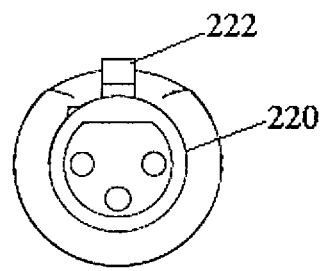
FIG. 12 is a drawing of a top view of the audio adapter of FIG. 10.
Figure 13:
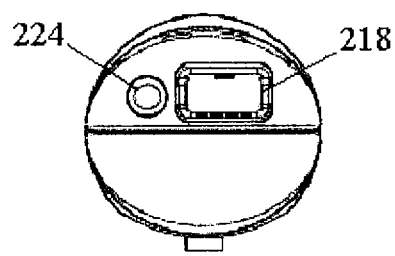
FIG. 13 is a drawing of a bottom view of the audio adapter of FIG. 10.

While the base units are described with the use of one or more PMMs, it should be understood that the system described below can be used with PMMs only, table-top microphones only, audio adapters only, or any combination of PMMs, table-top microphones, and audio adapters. The PMMs, table-top microphones, and audio adapters can all be charged with the same base units, as described in more detail below. For example, a base unit 118 and docking port 120 shown in FIG. 9 with the table-top microphones 110 is similar to base units 30, 50, and 60 and docking ports 36, 68 shown in FIGS. 2A-4B. This allows for increased flexibility in the number of users and room configurations for use with the audio systems described herein. In one exemplary embodiment, up to 16 PMMs and/or table-top microphones and/or audio adapters. In another embodiment, up to 24 PMMs, table-top microphones, and audio adapters in Europe can be used in a single room.

Base unit features are important in achieving a system that is simple to setup and use with any existing A/V equipment. The use of industry standard connectors, audio levels, and naming conventions simplifies integration into existing installations. The base unit automatically adjusts for any PMM installed into any docking port 38, 68 of the base unit (i.e. the PMMs are hot swappable). The base unit handles all of the audio multiplexing and gain adjustments, such that all PMM audio levels are equal prior to being combined and presented at the audio connector.

The form of the base unit is important to how the device will be used, where it is located in the room, and how readily the PMMs can be made available to users. The base unit can have a variety of configurations, shapes and sizes. In one exemplary embodiment, the base unit is designed such that it can be located in the middle of a table, on a credenza or mounted on a wall. This base unit can communicate with a plurality of PMMs and could be located, for example, in a conference room to be used in audio and/or audio-video conferencing with a variety of users. The base unit can include ports that are adapted to charge the PMMs and synchronize the PMMs to the base unit. These ports can be integrated to perform both of these functions, or the base unit can include separate ports dedicated to each function. For example, a base unit can include eight ports, each of which can charge the PMMs and synchronize them with the base unit. In another embodiment, all eight ports can be adapted to charge the PMMs and the synchronization can be accomplished separately, such as wirelessly or using radio frequency (RF) without any need for ports located on the base unit for synchronization. In a further embodiment, one or more of the ports could be used for charging, while the remaining port or ports are dedicated to synchronization. A person skilled in the art will appreciate that any combination and number of ports and wireless technology or RF can be used to charge the PMMs and synchronize them with the base unit.

The base unit can have a variety of configurations. The base unit can include a central PCB to support eight audio channels. The PCB carries four DECT RFPs, numbered 0-3 and each identified by a 2-wire stamp. Each DECT is based on a SC14429 baseband plus LMX4169-based radio and I²C EEPROM. Each SC14429 is connected to various LEDS and controls. In one embodiment, these include two front panel LEDs, two front panel pairing-control buttons, two rear-panel balanced audio inputs, two discrete amplifiers driving balanced rear-panel audio outputs, two logic-level Mute command outputs to a rear-panel DB25 connector, and an on-board UART connector for Flash programming and calibration. On the RFP 0, there is a rear-panel switch to select synchronization master/slave mode. All four RFP basebands have common digital wiring for a common system mute control line driven by a simple radio receiver, wire-ORed, with a digital input from the rear panel. They all have a mute mode control line driven by a rear-panel switch, with two modes; local mute and no local mute (an external device will perform muting if commanded to). Further, they have an inter-RFP 100 Hz logic-level synchronization signal which also appears on a rear-panel connector to allow inter-base station synchronization. In one embodiment, RFPs 1, 2, and 3 are synchronization slaves, and RFP 0 is either the master or slave depending on the rear-panel switch. They have an inter-RFP 3-wire SPI bus with RFP 0 as SPI master and the others as SPI slaves (for centralized pairing control), and a reset where all four RFP lines are commoned and driven by a discrete reset chip with open-controller output. The RF connections from the four transceivers are combined into two external antenna connectors, described in more detail below.

Figure 2A:
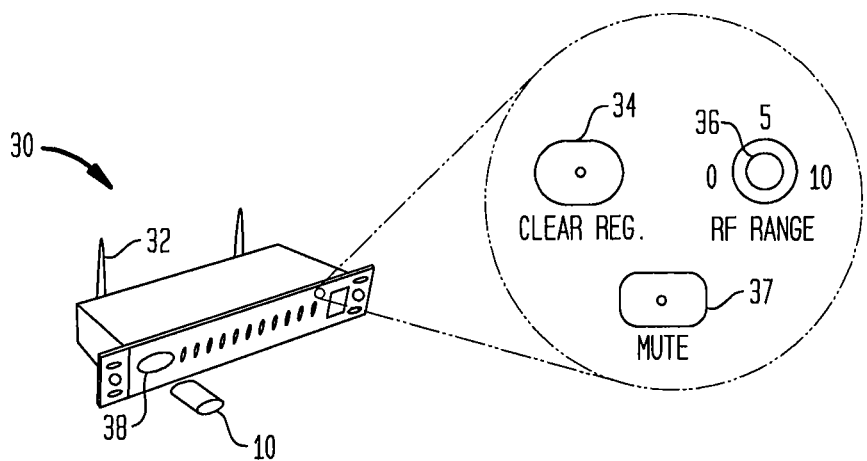
FIG. 2A is a drawing of one exemplary embodiment of a rack mounted base unit.
Figure 2B:
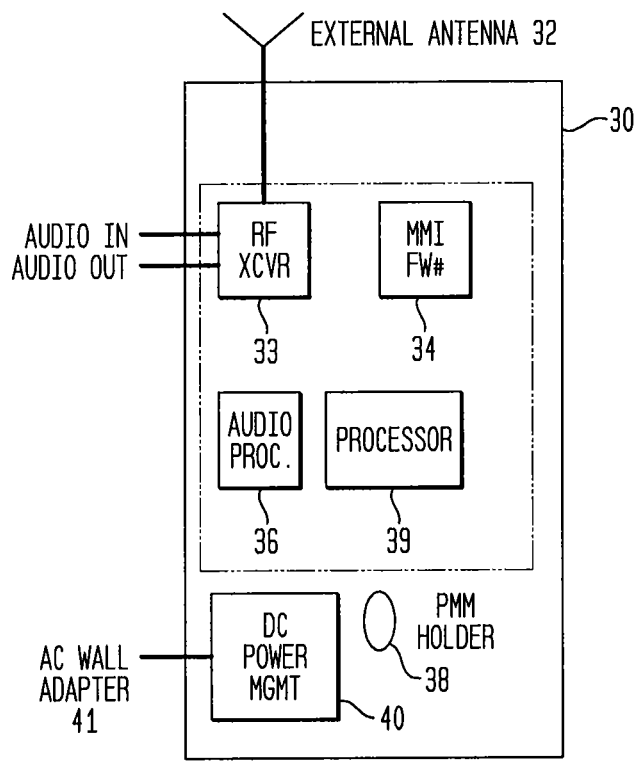
FIG. 2B is a functional block diagram the rack mounted integrated base/gateway unit shown in FIG. 2A.
Figure 3A:
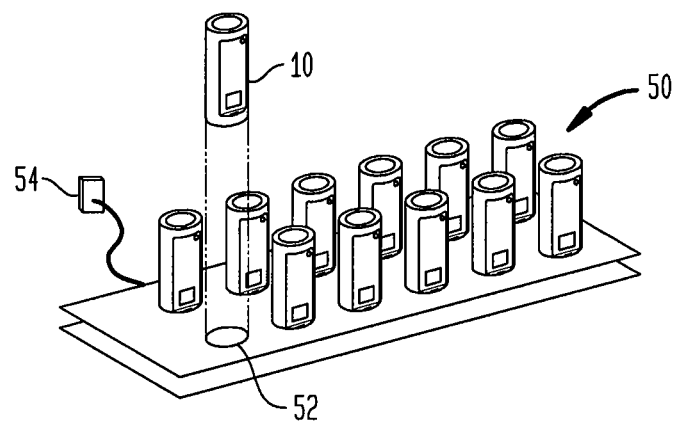
FIG. 3A is a drawing of one exemplary embodiment of a PMM charging base.

In one exemplary embodiment, the system utilizes a rack mounted base unit 30 shown in FIG. 2A with a charge station 50 shown in FIG. 3A, herein referred to as an executive system. In the preferred embodiment, the base unit 30, shown in FIGS. 2A-2B, includes a docking port 38 for registering the PMM 10 with the base unit 30, and a 'clear registration' button 34. The button 34 is used as a security feature, and can be used to clear the registration of the PMM 10 in the docking port 38. The base unit 30 also includes a mute button 37 which controls all the PMMs used with the base unit 30, and an RF range control knob 36 to control the RF range of the PMMs. The charge station 50 includes ports 52 for charging and/or registering the PMMs and an AC wall adapted to supply power to the charging station 50. In the preferred embodiment, the system includes eight PMMs, but a person skilled in the art will appreciate that the number of PMMs used can be varied. In other embodiments, the based unit and charge station can be integrated in one unit, or the charge station can be utilized for other applications separate from the rack mounted base unit. The charge station can be positioned in a number of locations in, for example, a conference room where it is being utilized, such as on a table in the room or wall mounted. The base unit can be access points that are connected, for example, via Ethernet, wirelessly or otherwise, to one or more central management computers that allow for many remote devices to link-up via one or more centrally managed ID access lists and digital audio routing. The central management computers can also include storage and post-processing that enable automated initiatives such as Sarbanes-Oxley compliance and corporate archive and monitoring initiatives.

Figure 3B:
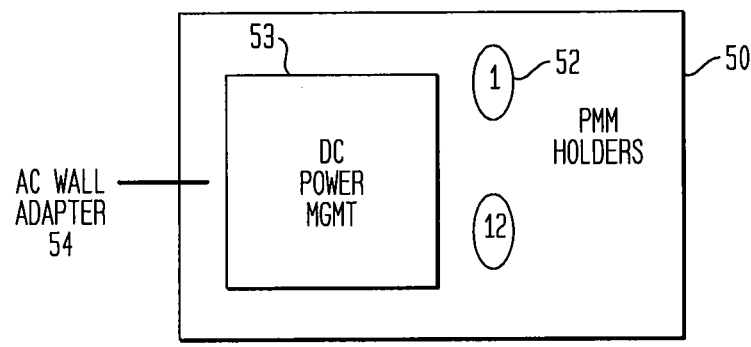
FIG. 3B is a functional block diagram of the PMM charging base shown in FIG. 3A.

FIGS. 2B and 3B illustrate functional diagrams of the base unit 30 shown in FIG. 2A and the charging station 50 shown in FIG. 3A. Power is supplied to the base unit 30 through an AC wall adapter 41 and is controlled by a DC power management component 40. A RF XCVR 33, as stated above, is one half of a wireless link comprised of hardware and software that enables full duplex (transmit & receive) communication of audio signals between two points. The other half of the wireless link can include another RF XCVR. A MMI FW 34 refers to software that enables a particular user experience to be achieved, namely how the visual cues, audio cues, or button presses allow the user to operate the product. Typically these functions are implemented on a microprocessor or digital signal processor (DSP) and may be combined with functions of the RF XCVR 33 and audio processing such as noise removal, echo cancellation and frequency equalization. Power is supplied to the charging station 50 through an AC wall adapter 54 and is controlled by a DC power management component 53.

Figure 4A:
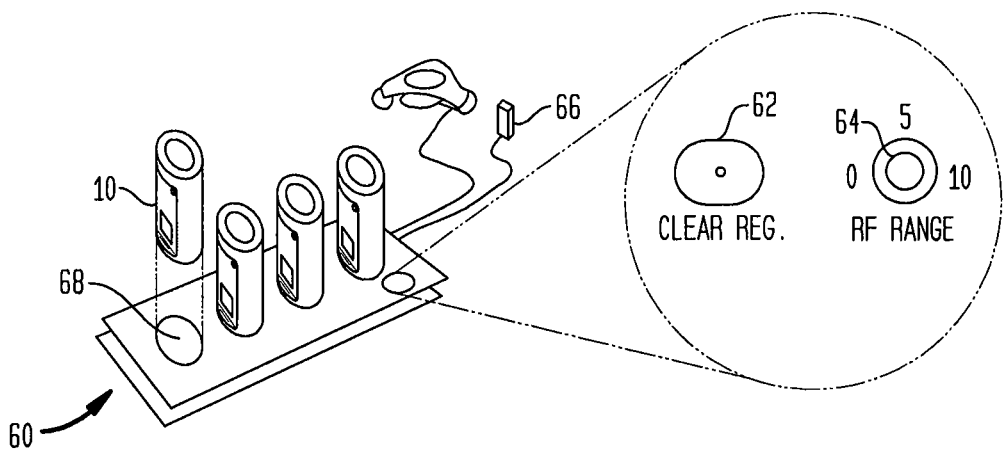
FIG. 4A is a drawing of the preferred physical characteristics.
Figure 4B:
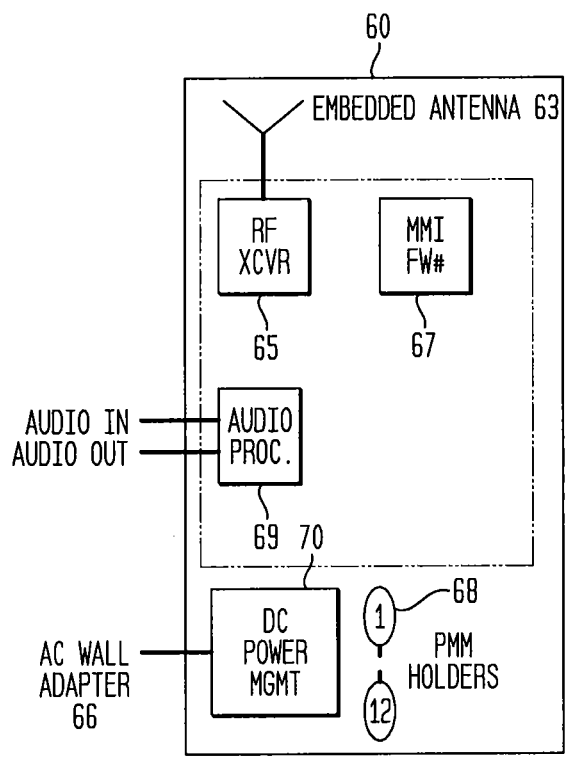
FIG. 4B is a functional block diagram, of a preferred embodiment of an integrated base/gateway/charger for the invention.

FIGS. 4A-4B illustrate an integrated base unit including a base unit and charging station capabilities. One or more docking ports 68 are adapted to hold a PMM 10 for registration and charging of the PMM 10. The integrated base unit includes controls for controlling the PMMs 10, including a clear registration button 62 and an RF range knob 64, discussed in more detail below. An AC wall adapted supplies power to the integrated base unit 60, which is controlled by a DC power management component 70. A RF XCVR 65 is one half of a wireless link comprised of hardware and software that enables full duplex (transmit & receive) communication of audio signals between two points. The other half of the wireless link can include another RF XCVR. A MMI FW 67 refers to software that controls the Man Machine Interface and that enables a particular user experience to be achieved, including how the visual cues, audio cues, or button presses allow the user to operate the product. Typically these functions are implemented on a microprocessor or digital signal processor (DSP) and may be combined with functions of the RF XCVR 65 and audio processing such as noise removal, echo cancellation and frequency equalization In another embodiment, the base unit can be a desktop base unit that is adapted for individual use and can be located, for example, in the office of a user. The desktop base unit can include at least one PMM, which can be used with the desktop base unit and/or with other base units, as is described in more detail below. The desktop base unit can also include a USB plug-n-play charger and/or a transceiver base. In one exemplary embodiment, the charger and/or transceiver can be integrated in a PC, laptop, handheld device, or any computing device. A number of difference PC interface bus technologies can be used, including, by way of non-limiting example, Ethernet, Firewire, WiFi, IR, Serial Port (RS232), Parallel port (IEEE), and PCMCIA interface.

A Flash chip can be included with the base unit which can store software needed to operate the base unit. A person skilled in the art will appreciate that any chip capable of storing software can be used. The software provides a variety of functionality for the base unit as described below. The desktop base unit has similar software functionality.

The base unit and desktop base unit can also include one or more antenna. The desktop base unit can incorporate dual antennas, with normal ('slow') diversity control in the first instance, with an option for Fast Antenna Diversity as a software upgrade. Fast antenna diversity can be accomplished by having a receiver sample the received signal strength from each of two different antennas, and then choose to receive data transfer on the better of the two options. The rate at which the receiver evaluates and selects which antenna to use is what decides if your doing fast or slow diversity schemes. Fast schemes will use switching frequencies on the same order as a single frame rate for data packets, where as slow diversity schemes will only change over multiple or many multiples of data packets. The base unit can have 'slow' antenna diversity per baseband, with options for Fast Antenna Diversity. Eight RF connections can be combined via four switches into four external antenna connectors The switched can control time-multiplexing between two pairs of Radio Fixed Parts (RFP). The time-multiplexing switches can be controlled by an output from RFP 1, allowing the same I/O pin to be used an a sync master/slave selector input on RFP 0. The antennas from each pair of RFPs can be combined with passive splitter/combiners, allowing each pair of RFPs to operate in a common time slot. This would result in only two external antenna connections, but at the penalty of at least 3 dB less link budget.

Ease of setup, use and operational status are driven by the proper design and implementation of the system operating software. The system is designed such that the operation of LED's and buttons provide visual and tactile status in an intuitive manner. Audio processing and handling are important to far-end performance results. Examples include: combining of audio channels, gain control, echo-cancellation. Smart power management of the PMMs allows increased battery life by using low power modes when possible.

Functionality of the System
Interoperability Between the PMMs and/or Table-Top Microphones and/or Audio Adapters and the Base Units The following are operational features of the preferred embodiment of the PMM, the table-top microphone, the audio adapter, and the Base Unit. It should be understood that the system described below can be used with PMMs only, table-top microphones only, audio adapters only, or any combination of PMMs, table-top microphones, and audio adapters.

PMM features include a functionality that operates when the PMM is removed or inserted into a base unit. For example, the PMM can automatically link to a base unit by RF whenever it is removed from the charger. If the PMM is "registered" with the base unit, a base audio channel is assigned to the PMM. The PMM can also automatically mute the microphone when it is removed from the charging base, with the mute status indicated via a PMM LED 16 (e.g. flashing red), as shown in FIG. 1A. This allows users to 'silently' attach the PMM before going live with their audio. Once the PMM is in place, the user can activate their audio by pressing the mute/unmute button 14 shown in FIG. 1A, and the LED will indicate 'live audio' by, for example, flashing another color (e.g. blue or green). When a PMM is inserted into a base unit, the PMM can automatically shut down the RF link. When recharging begins, the recharge status can be indicated by the PMM LED 16. The PMM unit registration is also updated when it is inserted into the base unit.

The PMM can automatically enter into a 'power save' mode after long periods of inactivity. This can be accomplished when there is no microphone signal, no state change and/or no motion for a set time period. For example, a general purpose I/O pin on the PMM's main processor could be driven by an analog detection circuit that provide digital high and low conditions based on a threshold level of audio input on the PMM microphone line (ex. 1-2 mV rms). A timer would be started when no audio was detected, and once the timer reached a 'time-out' period (ex. 15 minutes) then the PMM would initiate a low-power state, removing the wireless link. The PMM would then wake up when placed into the charger base unit or when the mute button was pressed. This feature prevents the PMM from running out of battery when left on the table and not returned to the charger after a conference. Alternatively, during this mode the microphone can be monitored by the base unit with which it is registered, and the PMM returned to 'active' mode by the base unit when the PMM microphone outputs an audio signal above the threshold level.

A number of other function can be employed by the PMM, including that the PMM can signal the user when it has left the range of the base unit, for example, by vibrating and/or beeping when the user leaves the range. When out of range, the microphone can be automatically muted and the PMM can enter an 'inactive' mode in which the PMM audio output is monitored. This prevents users from wearing a PMM back to their office or home. The PMM can also employ 128-bit encryption on digital audio data, as well as RF power limiting (PMM radiates less power when closer to the base unit), advance spread spectrum and frequency hopping techniques, all ensuring maximum security. The PMM can register with base unit at contact with the base unit, allowing the PMMs to be 'hot swappable' between base units, thus allowing administrators greater flexibility in configuring their systems. This feature will be discussed in further detail below.

Base unit features includes features to control communication between the PMMs and the base unit. A 'Mute' button 37 can concurrently mute/unmute audio for all active PMMs and the current status of the PMMs can be indicated with LEDs on all PMMs and on the base unit. A 'range-control' knob 36, 64 (shown in FIGS. 2A and 4A) at the base unit can allow the system administrator to limit the RF operational range between the base unit and all the registered PMMs. In one embodiment, the range can be set from 30 ft. to 300 ft. This can be accomplished by setting a PMM transmit power or a base unit received signal strength threshold. This is a security feature as well as a power-saving feature.

The base unit can automatically assign the next available audio channel to an unregistered PMM (preferably, there are 12 channels allowed per base, but that is a convenience issue, not a design issue) when it is placed into the 'Register Port' on the base unit. Successful registration will be indicated via the PMM's LED (e.g. 5 rapid flashes of the LED).

Rack-mount base unit (FIGS. 2A and 2B) can include audio ports for each individual PMM channel (for example, up to 12 PMMs) as well as a 'conferenced' audio port which combines all PMM channels together intelligently using automatic gain control, microphone voice switching, and mix/minus techniques. The single PMM holder 38 on this base unit provides PMM registration capabilities. When this base unit is used in place of an integrated Base/Gateway/Charger, the charging base 50 shown in FIGS. 3A and 3B would be used to hold and recharge the PMMs when they are not in use.

An additional feature is the 'Clear Registration' button 34, 62, (located on integrated Base/Gateway units 30, 60). When pressed, the pairing information between the base unit and all PMMs is cleared. This allows only PMMs that are registered for a particular call to be active. This is an optional security feature.

A 'register port' 52 can be included in the charging-only base 50, or the integrated base 60 shown in FIGS. 4A and 4B. In the charge-only base unit, a radio link would then enable PMM registration with the rack-mount base unit.

Additional processing 39, FIG. 2B, can be included in any of the base units for this invention. Processor 39 can be used for back-end audio processing such as speech recognition, automatic transcription processing, and data mining. Further, the base unit functionality could be built directly in to a speaker phone or a videoconferencing unit, rather than be accomplished as a stand-alone device. This integration would allow the base unit to also perform the functions of a traditional speaker phone/videoconferencing unit when the wireless conferencing aspect is not necessary.

Figure 5:
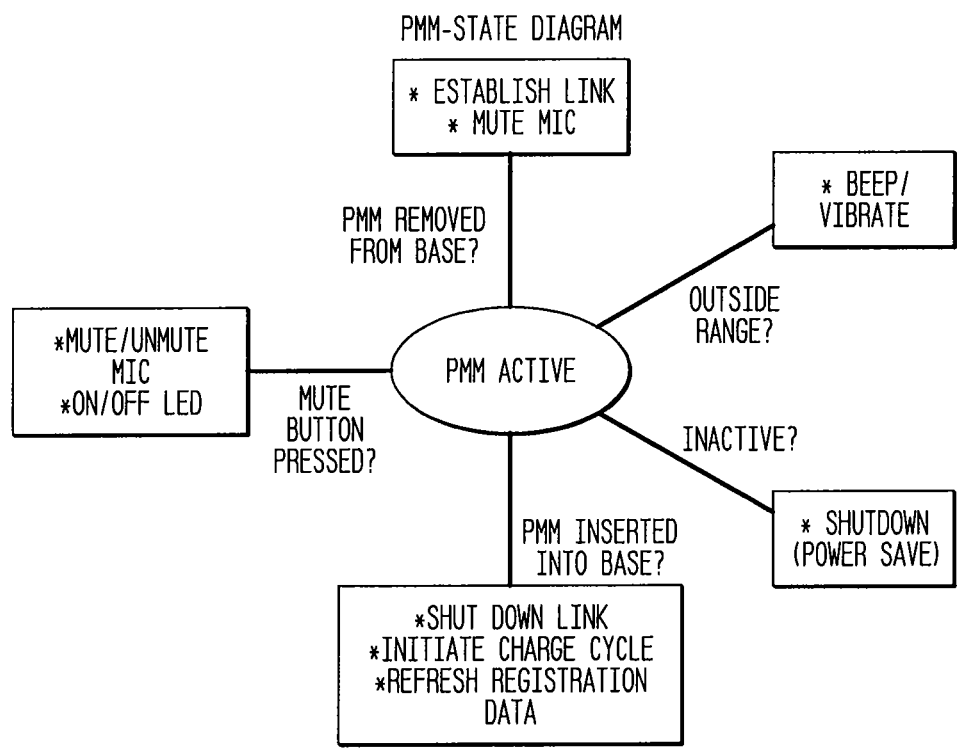
FIG. 5 is a state diagram of an embodiment of a PMM for the invention.
Figure 6:
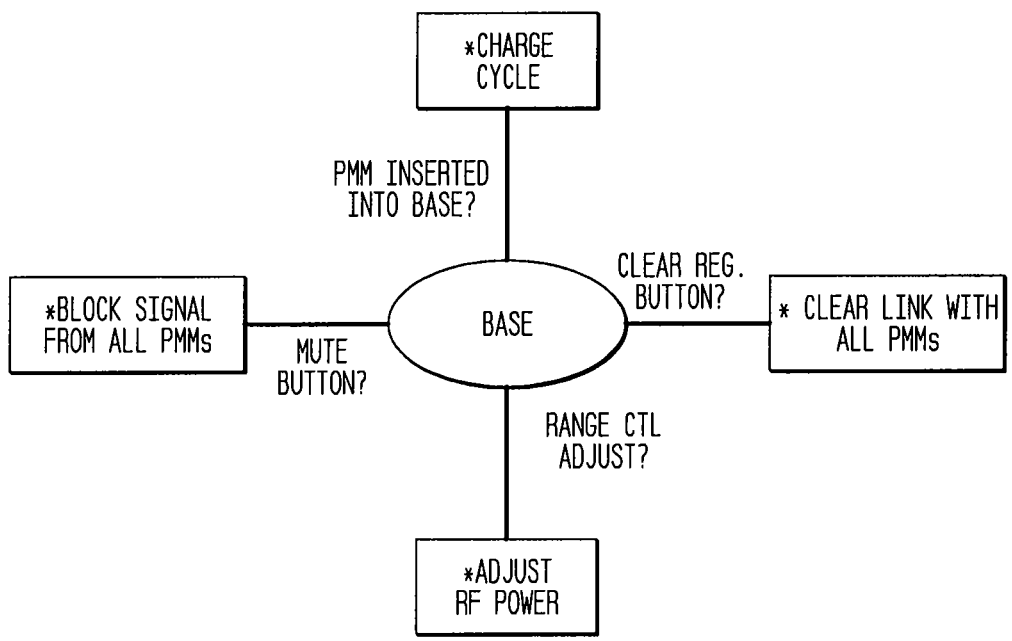
FIG. 6 is state diagram of an embodiment of a base unit for the invention.

The functionality described above is accomplished through custom firmware that controls audio processing, power management and the RF transceiver functions. Additionally, all LED indicators and functionality of user interfaces are controlled through this combination of embedded firmware and processors. FIG. 5 'PMM-STATE DIAGRAM' and FIG. 6, 'BASE-STATE DIAGRAM' disclose further functional and operational details.

The ability to provide a modular system hardware architecture allows customers to buy only the correct number of PMMs for the room they are equipping. As an example: a primary base unit can have all the power, audio and MMI interfaces, as well as, for example, 4 PMMs. The customer can then buy an extension base with 4 PMMs that attaches through a connector to the primary, and will automatically connect audio, power, etc., from the primary base. The extension base will not require full interface connections, power supply or base radio chipset. The PMMs in the extension bases will link up to the radio in the primary base. Two or more extension bases could be added to a primary base, allowing for additional PMMs to be available to the room.

The configuration of the above system allows the PMMs to work with multiple transceivers in different locations within an enterprise. To accomplish this feature, a PMM can tap into a charge base in a particular location, either an executive or a desktop system. The remote unit will automatically link with that system. In order for this feature to function, in one embodiment, a one-time pairing between the PMM and the base unit must be accomplished in order for that PMM to tap into that base unit. In another exemplary embodiment, tapping can be eliminated using RF detection and ID management to allow for automatic detection and pairing of a PMM to a base unit.

In one embodiment of the invention, the system, utilizing wireless technology, is based on a customized version of DECT (1.9 Ghz in the United States, or 1.8 Ghz in Europe) which operated in a license free ISM band. This customization allows for wideband audio transmission (for example, 16-17 kHz for 8-8.5 kHz audio bandwidth), up to 36 channels to be in the air at the same time without degraded audio quality, and encrypted data transmission. A variety of other wireless platforms can be utilized to achieved similar performance, including, by way of non-limiting example, WDECT (2.4 Ghz), DECT (5.8 Ghz), Bluetooth (2.4 Ghz), ultra wideband, ZigBEE, InfraRed, and any direct sequence spread spectrum (DSSS) or frequency hopping spread spectrum (FHSS) proprietary radio architecture operating on ISM bands.

Selection of the proper radio architecture/standard is important to obtaining the expandability/modularity, full duplex audio capabilities, total number of PMMs, power management, range, small size and cost to manufacture. Being able to secure country approval to use the product 'globally' requires operational frequencies within particular ISM bands. For these reasons, the DECT radio standard and associated chipsets that are commonly used in mobile & cordless phone systems are ideal for use in the invention. Being able to provide wide-band audio over the radio link is desirable but would require a derivative to the DECT standard chipsets be developed.

Variations on the base/microphone could be made available containing other types of wireless microphones. Examples include: wireless tabletop sector microphones for conference with re-configurable tables, wireless handheld microphones for auditoriums and roaming interviewers and headsets.

A person skilled in the art will appreciate that the interoperability between the PPMs and the base units described above also applies to the interoperability between the tabletop microphones and the base units and the audio adapters and the base units described herein.

Personal Microphone Module, Table-Top Microphone, and Audio Adapter Registration A personal microphone module (PMM), a table-top microphone, and an audio adapter can register with one or more base units. In one embodiment, a base unit can include eight PMMs, with each PMM being paired to one of the eight channels on the rack base unit (as shown in FIG. 2A), while a desktop base unit can include a PMM paired to a USB base on the desktop base unit. It should be noted that any PMM can be paired to any channel. For example, in this embodiment each channel on the rack base unit can store up to eight paired PMMs, and any of these can connect with that channel if that channel is available, e.g., not being used by another PMM. This allows for a PMM to pair with multiple base units.

In one exemplary embodiment, the method of pairing a PMM with a base unit includes muting the PMM (for example, the LED on the PMM is red to indicate that the PMM is muted). The user then presses the desired channel button on the rack base unit (or the mute button on the desktop base unit), until the LED signals that the two devices are paired, for example, when the LED remains red. A number of methods could be used to confirm the pairing, including, in one exemplary embodiment, a green flash on the LED of the PMM and/or the base unit. Following the confirmation that the pairing was successful, an audio link between the two devices is established.

If a PMM is paired with multiple bases, a user can link that PMM with any of these base units. This is achieved by "tapping in", which involves docking or removing the PMM from the charge base for the base unit the user wished to be paired to. This allows the PMM to know which system it should be operating with. In order for the pairing to be accomplished, the paired channel must be available (no other PMM can be linked to that channel). In order to tap in to a base unit, the user must be physically present, which adds a security benefit of preventing users who are unauthorized to join a certain conference from tapping in to the base unit during that time.

A person skilled in the art will appreciate that registration process described above relative to the PMMs also applies to the table-top microphones and the audio adapters described herein.

Video Conferencing and User Tracking

Figure 7:
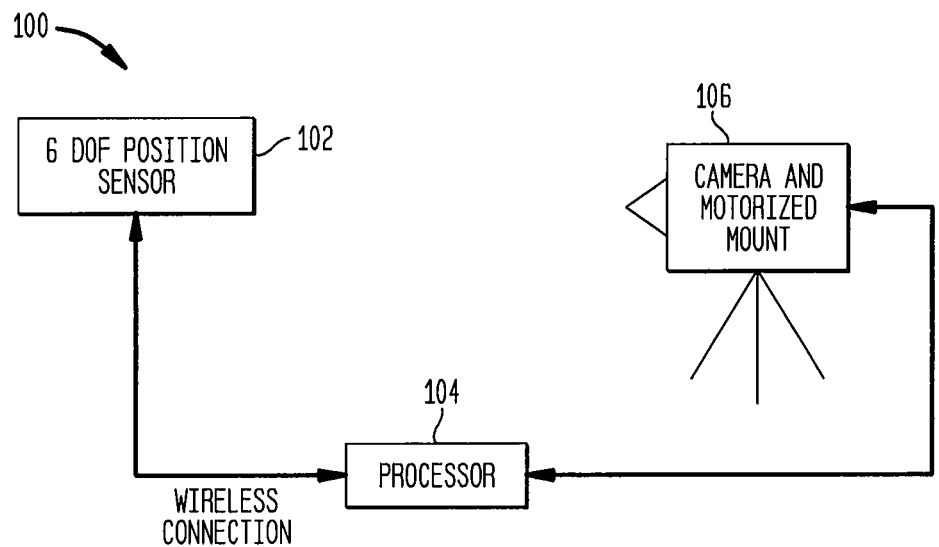
FIG. 7 is a schematic diagram of an embodiment of the system of the invention which also includes video tracking of users.

This system can also be expanded to achieve video conferencing. A standard video conferencing system could be used but with the wireless audio system disclosed herein. Alternatively, the invention can include video conferencing in which the speaker is automatically tracked by a video camera. A simplified schematic diagram of one embodiment of such an automatic video tracking scheme is shown in FIG. 7. Video camera and motorized camera mount 106 is controlled by processor 104 that is in wireless communication with user position sensor 102. Preferably, position sensor 102 is a six degree of freedom tracking system such as are known in the field. Examples of six degree of freedom tracking systems are available from InterSense, Bedford, Mass. Tracker 102 provides information establishing the position in space of the person carrying a PMM or a conventional wireless microphone coupled to an audio adapter. Location information from the one or more position sensors 102 is interpreted by processor 104, which sends appropriate drive signals to motorized camera 106 so that the camera is moved as necessary to keep the speaker framed by the camera. The six degree of freedom position sensing system could be integrated into the PMMs and the audio adapters, or accomplished separately and then carried on the user's person.

Tracking capability can be implemented for multiple PMMs, audio adapters, and table-top microphones by having the user press a function button on the PMM and/or table-top microphone and/or audio adapter when the user is ready to talk, or otherwise when the user desires to be tracked by the camera. The camera position would then be controlled in response to function button presses received by the base unit. There could also be another version of an 'automatic' mode to track multiple PMMs, audio adapters, and table-top microphones, where the microphone audio levels would trigger the camera to go to the highest level of incoming audio (presumably the person speaking. If more than one person begins talking at the same time, the camera system would stay on the current PMM, audio adapter, or table-top microphone until there is only one person talking, then move to that person. There would be minimum time gates applied to avoid having the camera move when somebody coughs or makes a brief comment but doesn't need to be on camera.

A person skilled in the art will appreciate that the video conferencing and user tracking system described above applies to the PMMs, the table-top microphones, and the audio adapters.

The inventive system can be adapted to be remotely controlled, accessed and/or updated through the use of a network interface in the base station (e.g. using Ethernet, IP or wireless IP).

The primary implementation of this system is targeted at the audio/video conference call market. Other applications include, but are not limited to, medical/legal dictation. In this application the audio track is securely transmitted and captured electronically for future reference, archival purposes and/or to meet legal requirements.

Although specific features of the invention are shown in some drawings and not others, this is for convenience, as the various features may be combined in other manners in accordance with the claimed invention.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

The invention claimed is:

1. A wireless audio microphone system for use in audio conferencing among a number of users, comprising:
   a base unit that is configured to removably store, recharge, and communicate with at least one personal microphone module (PMM) and at least one audio adapter that is configured to removably couple to a conventional wireless microphone; and
   the at least one PMM comprising a mutable microphone and a microphone mute-status indicator, and being configured to be removably coupled to a user's clothing, and to communicate wirelessly with one base unit at a time;
   wherein a wireless link is automatically established between the at least one PMM and the base unit and the at least one audio adapter and the base unit upon registration with the base unit such that the base unit assigns a unique audio channel to the at least one PMM and the at least one audio adapter;
   wherein the at least one PMM microphone is automatically muted when the at least one PMM is removed from the base unit;
   wherein the at least one audio adapter is automatically muted when the at least one audio adapter is removed from the base unit; and
   wherein the base unit is configured to perform audio mixing and gain control and comprises a conferenced audio port which combines all audio channels.

2. A method of wireless audio communication, comprising:
   registering one or more personal microphone modules (PMMs) with a first base unit by pressing a button on each of the PMMs and the first base unit so as to cause unique registration to pair the one or more PMMs with the first base unit;
   registering one or more audio adapters with the first base unit by pressing a button on each of the audio adapters and the first base unit so as to cause unique registration to pair the one or more audio adapters with the first base unit;
   registering the one or more PMMs with a second base unit by pressing a button on each of the PMMs and the second base unit so as to cause unique registration to pair the one or more PMMs with the second base unit and to deactivate a connection between the PMMs and the first base unit; and registering the one or more audio adapters with the second base unit by pressing a button on each of the audio adapters and the second base unit so as to cause unique registration to pair the one or more audio adapters with the second base unit and to deactivate a connection between the audio adapters and the first base unit;

wherein the one or more PMMs and the one or more audio adapters can be used to communicate with only one base unit at any time; and wherein the one or more audio adapters are configured to removably couple to a conventional wireless microphone.

\* \* \* \* \*